(12) United States Patent
Qiu et al.

(10) Patent No.: US 9,977,836 B2
(45) Date of Patent: May 22, 2018

(54) STORING METHOD AND APPARATUS FOR DATA ACQUISITION

(71) Applicant: TENCENT TECHNOLOGY (SHENZHEN) COMPANY LIMITED, Shenzhen, Guangdong Province (CN)

(72) Inventors: Yue Peng Qiu, Guangdong (CN); Jian Kui Liao, Guangdong (CN); Meng Zhang, Guangdong (CN); Cheng Tao Fan, Guangdong (CN); Gong Wei Li, Guangdong (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 215 days.

(21) Appl. No.: 14/732,231

(22) Filed: Jun. 5, 2015

(65) Prior Publication Data
US 2015/0269277 A1    Sep. 24, 2015

Related U.S. Application Data

(63) Continuation of application No. PCT/CN2014/085004, filed on Aug. 22, 2014.

(30) Foreign Application Priority Data

Aug. 26, 2013 (CN) .......................... 2013 1 0377205

(51) Int. Cl.
*G06F 17/30*   (2006.01)

(52) U.S. Cl.
CPC .. *G06F 17/30952* (2013.01); *G06F 17/30551* (2013.01); *G06F 17/30864* (2013.01)

(58) Field of Classification Search
CPC ......... G06F 17/30091; G06F 17/30115; G06F 17/30194
See application file for complete search history.

(56) References Cited

U.S. PATENT DOCUMENTS

| 7,392,235 B2 * | 6/2008 | Armangau ........ G06F 17/30551 |
| 7,526,462 B2 | 4/2009 | Sakurai et al. |

(Continued)

FOREIGN PATENT DOCUMENTS

| CN | 101667205 A | 3/2010 |
| CN | 102402592 A | 4/2012 |
| CN | 102841823 A | 12/2012 |

OTHER PUBLICATIONS

Tencent Technology, ISRWO, PCT/CN2014/085004, dated Dec. 2, 2014, 7 pgs.

(Continued)

*Primary Examiner* — Amanda L Willis
*Assistant Examiner* — Vaishali Shah
(74) *Attorney, Agent, or Firm* — Morgan, Lewis & Bockius LLP

(57) ABSTRACT

Disclosed is a storing method for data acquisition, including: acquiring a collected data, and acquiring a generation time and a collection time for the collected data; obtaining an offset by computing a difference between the generation time and the collection time; and acquiring a default offset threshold, and determining whether the offset being less than the default offset threshold; if so, acquiring a centralized storage directory corresponding to the collected data, acquiring a generation time sub-directory corresponding to the generation time under the centralized storage directory, acquiring an offset sub-directory corresponding to the offset under the generation time sub-directory and storing the collected data in the offset sub-directory. The invention also (Continued)

provides a storing apparatus for data acquisition. The storing method and apparatus for data acquisition improve the data access efficiency.

18 Claims, 5 Drawing Sheets

(56) References Cited

U.S. PATENT DOCUMENTS

| | | | |
|---|---|---|---|
| 8,989,255 B2* | 3/2015 | Mito | H04N 19/46 375/240 |
| 2006/0271533 A1 | 11/2006 | Sakurai et al. | |
| 2009/0240869 A1* | 9/2009 | O'Krafka | G06F 12/0284 711/103 |
| 2010/0188197 A1* | 7/2010 | Ackley | H04Q 9/00 340/10.1 |

OTHER PUBLICATIONS

Tencent Technology, IPRP, PCT/CN2014/085004, dated Mar. 1, 2016, 4 pgs.

* cited by examiner

STORING METHOD AND APPARATUS FOR DATA ACQUISITION

CROSS REFERENCE TO RELATED APPLICATION

This application is a continuation of International Application No. PCT/CN2014/085004 filed Aug. 22, 2014, which claims priority to Chinese Patent Application CN2013103772057 filed Aug. 26, 2013.

BACKGROUND OF THE INVENTION

1. Field of the Technology

The present disclosure relates to the field of data mining techniques, and in particular to a storing method and apparatus for data acquisition.

2. The Related Arts

In data mining, sampling is executed to acquire a large amount of data so that data analysis can be performed on the collected data. In known techniques, as shown in FIG. 1 and FIG. 2, each of a plurality of sampling servers collects data according to its own default period T (such as, T can be a day, which means that the sampling server collects data once per day). The time for the sampling server to collect data is called the generation time of the collected data (such as, T0, T0+T, etc. in FIG. 1). The sampling server then transmits the collected data at indefinite time to a statistics server to summarize and store. The time for the statistics server to receive the collected data is called the collection time for the collected data (such as, T0+4T and T0+2T in FIG. 1).

When the statistics server stores the collected data, the statistics server usually constructs a directory according to the collection time for a same type of collected data, and then constructs sub-directories according to the generation time of the collected data under the directory.

The above storage method is known to have the following disadvantage: when searching according to the generation time, the search must traverse all the directories storing collected data and perform search based on the generation time. As such, the number of directories to be traversed is larger and the access efficiency is low.

SUMMARY

The embodiments of the present invention provide a storing method for data acquisition that is able to increase access efficiency.

In an aspect, an embodiment provides a storing method for data acquisition, which comprises:

acquiring a collected data, and acquiring a generation time and a collection time for the collected data;

obtaining an offset by computing a difference between the generation time and the collection time; and acquiring a default offset threshold, and determining whether the offset being less than the default offset threshold; if so, acquiring a centralized storage directory corresponding to the collected data, acquiring a generation time sub-directory corresponding to the generation time under the centralized storage directory, acquiring an offset sub-directory corresponding to the offset under the generation time sub-directory and storing the collected data in the offset sub-directory.

The embodiments of the present invention provide a storing apparatus for data acquisition that is able to increase access efficiency.

In another aspect, an embodiment of the present invention provides a storing apparatus for data acquisition, which comprises:

a data receiving module, for acquiring a collected data, and acquiring a generation time and a collection time for the collected data;

an offset computing module, for obtaining an offset by computing a difference between the generation time and the collection time; and a data storing module, for acquiring a default offset threshold, and determining whether the offset being less than the default offset threshold; if so, acquiring a centralized storage directory corresponding to the collected data, acquiring a generation time sub-directory corresponding to the generation time under the centralized storage directory, acquiring an offset sub-directory corresponding to the offset under the generation time sub-directory and storing the collected data in the offset sub-directory.

The above storing method and apparatus for data acquisition employs an offset threshold, and determines the position of the collected data in the centralized storage directory based on the offset threshold, and stores the collected data in the offset sub-directory corresponding to the offset under the generation time sub-directory corresponding to the generation time of the collected data under the centralized storage directory, and can find the position of and access the collected data in the corresponding directory according to the offset. Compared to the known technique of traversing all the collected data when accessing, the present invention improves the access efficiency.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art; other drawings may be easily obtained from these drawings without paying any creative effort. In the drawings.

DETAILED DESCRIPTION OF THE PREFERRED EMBODIMENTS

The following refers to drawings in the embodiments to provide a clear and complete description of the techniques disclosed in the embodiments. Apparently, the embodiments described below show only some exemplary embodiments, instead of all embodiments, of the present invention. Based on these embodiments of the present invention, all other embodiments which may be easily obtained by those having ordinary skills in the art without paying any creative effort all also within the scope of the present invention.

Figure 1:
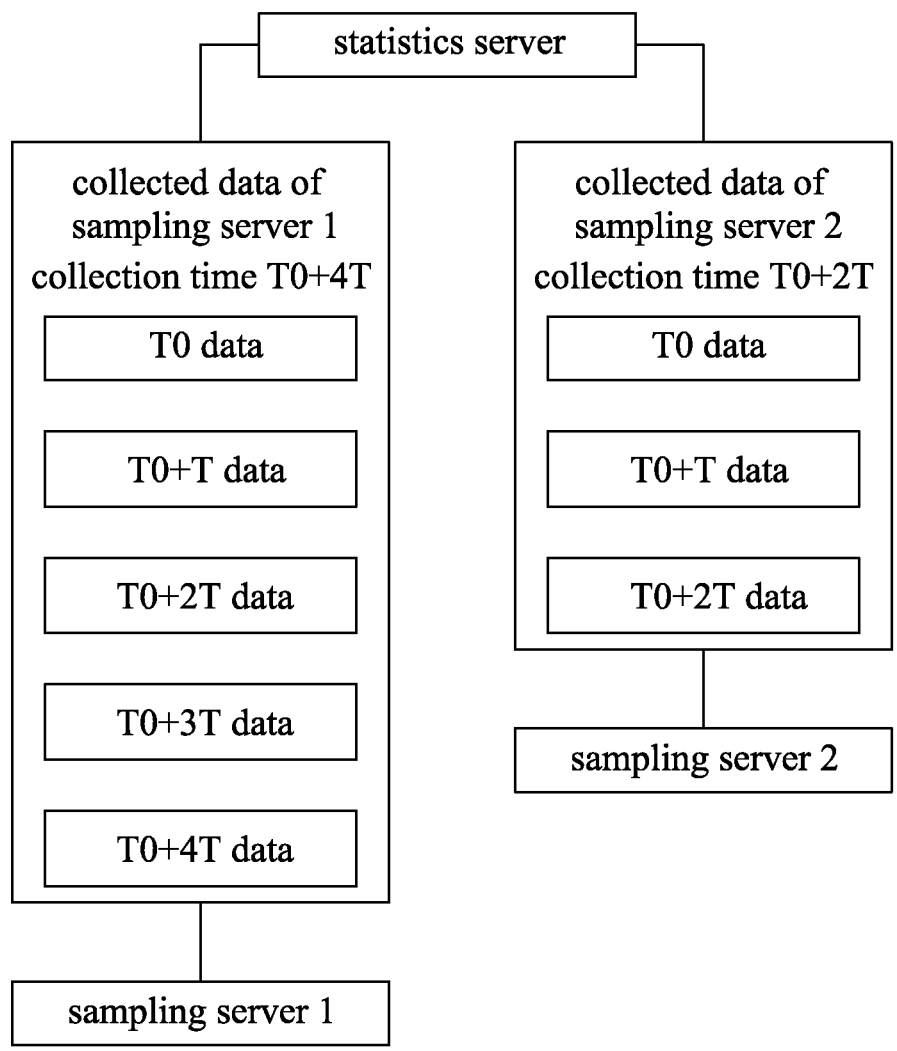
FIG. 1 is a schematic view showing a dataflow in known data acquisition system.

In a known embodiment, as shown in FIG. 1, a data acquisition system comprises a statistics server and a plurality of sampling servers connected to the statistics server. The sampling servers, based on sampling periods (such as, hour, day, and so on), collect data. The time at which the data is collected becomes the generation time of the collected data (where the collected data is generated at this point of time through data acquisition in the sampling servers; thus, the time is referred to as generation time with respect to the statistics server), as shown in FIG. 1. The sampling servers transmit the collected data to the statistics server at irregular periods. The time at which the statistic server receives the collected data is referred to as the collection time of the collected data (where the collected data is transmitted by the sampling servers to the statistics server at this point of time to be successfully collected by the statistics sever; thus, the time is referred to as collection time with respect to the statistics server.)

Figure 2:
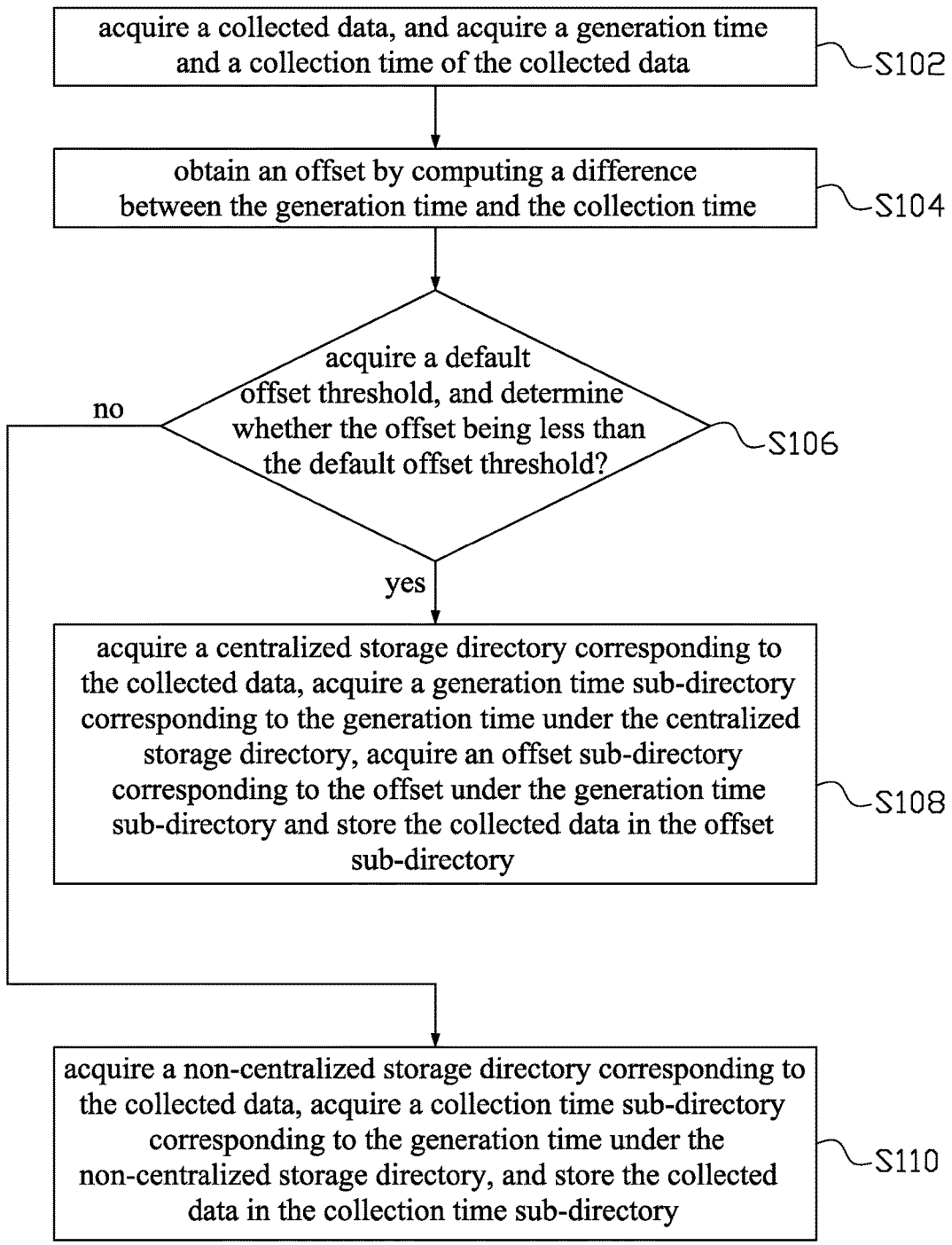
FIG. 2 is a flowchart of a storing method for data acquisition according to an embodiment of the present invention.

In an embodiment of the present invention, as shown in FIG. 2, a storing method for data acquisition is provided. The method depends completely on a computer program. The computer program is executed on a statistics server based on von Neumann architecture. The method comprises:

Step S102: acquiring a collected data, and acquiring a generation time and a collection time of the collected data.

In the instant embodiment, the statistics server can acquire collected data through uploading by the sampling servers, and the sampling servers can collect data at default interval (i.e., the period) and store the data as independent file. The generation time of the file is the generation time of the collected data. When receiving the collected data, the statistics server records the time and the recorded time is the collection time of the collected data.

Step S104: obtaining an offset by computing a difference between the generation time and the collection time.

The offset is the number of sampling periods passed between the generation time and the collection time of a collected data. For example, if the sampling period is a day, the offset is 3 when the generation time is Aug. 1, 2013 and the collection time is Aug. 4, 2013.

Step S106: acquiring a default offset threshold, and determining whether the offset being less than the default offset threshold; if so, executing step S108: acquiring a centralized storage directory corresponding to the collected data, acquiring a generation time sub-directory corresponding to the generation time under the centralized storage directory, acquiring an offset sub-directory corresponding to the offset under the generation time sub-directory and storing the collected data in the offset sub-directory.

In the instant embodiment, if the offset is greater than or equal to the offset threshold, execute step S110: acquiring a non-centralized storage directory corresponding to the collected data, acquiring a collection time sub-directory corresponding to the generation time under the non-centralized storage directory, and storing the collected data in the collection time sub-directory.

The centralized storage directory and the non-centralized storage directory are two directories in the file system of the statistics server. Preferably, the centralized storage directory and the non-centralized storage directory are under the directory of a same type. The collected data can be categorized in advance so that the collected data of the same data type can be stored in the centralized storage directory and the non-centralized storage directory of the same type, i.e., able to acquire a data type of the collected data, acquire a type directory corresponding to the data type; and acquire the centralized storage directory/non-centralized storage directory under the type directory.

For example, the data type of the collected data can be confirmed based on the format of the collected data. The picture-typed collected data can be stored in the picture directory, and the video-typed collected data can be stored in the video directory. The picture directory and video directory can establish respective centralized storage directory and non-centralized storage directory underneath.

Figure 3:
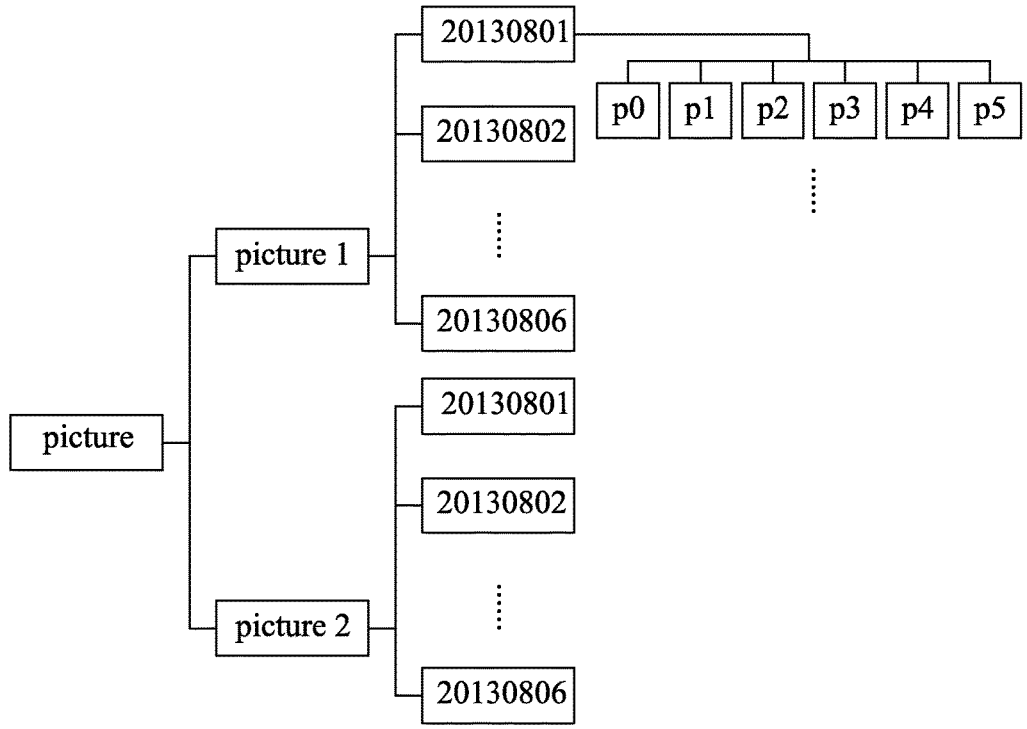
FIG. 3 is a schematic view showing a storage structure of a file according to an embodiment of the present invention.

In the application scenario corresponding to the instant embodiment, as shown in FIG. 3, the picture directory (type directory) is for storing collected data of the picture type. The picture1 directory under the picture directory is the centralized storage directory and the picture2 directory under the picture directory is the non-centralized storage directory. The default offset threshold is 6, and can be recorded in the configuration file and can be obtained through accessing the configuration file. If the offset of the collected data is less than 6, the collected data can be stored in the picture1 directory; in other words, the picture1 directory and its sub-directories store the collected data with offset between 0 and 5.

As shown in FIG. 3, if the generation time of the collected data of a picture type is Aug. 1, 2013, the corresponding generation time sub-directory under the picture1 directory is the 20130801 directory. If the collection time of the collected data is Aug. 4, 2013, i.e., the offset is 3, the corresponding offset sub-directory under the generation time sub-directory (i.e., the 20130801 directory) is the p3 directory, and the collected data can be stored in the p3 directory. In other words, the p0-p5 directories (offset sub-directories) under the 20130801 directory of FIG. 3 store respectively the collected data with the generation time Aug. 1, 2013 and the collection time between Aug. 1, 2013 and Aug. 6, 2013. That is, the collected data stored in p0-p5 directories are the data uploaded respectively between Aug. 1, 2013 and Aug. 6, 2013 by the plurality of sampling servers to the statistics server.

As shown in FIG. 3, for the collected data with collection time Aug. 9, 2013, the offset is 8, which is greater than the offset threshold 6. Therefore, the collected data is stored in the sub-directory under the non-centralized storage directory picture2. Based on the collection time Aug. 9, 2013, the corresponding collection time sub-directory under the picture 2 directory for the collected data is the 20130908 directory, and the collected data is stored under the 20130809 directory. That is, for the collected data with offset larger than the offset threshold, the collected data are stored under the corresponding collection time sub-directory under the non-centralized directory according to the collection time.

In another embodiment, the user can access the collected data stored at the statistics server through inputting keyword. The keyword can comprise data type, collection time keyword, generation time keyword, and so on. The corresponding type directory can be found according to the data type. For example, if the data type in the keyword is picture, the picture directory is located.

For the collection time keyword, the method of accessing corresponding collected data comprises:

acquiring an inputted collection time keyword, and extracting a first input time;

in the centralized storage directory, acquiring a generation time sub-directory with a generation time differing from the first input time by less than a threshold offset, and the sum of the generation time of the corresponding generation time sub-directory and the offset of the corresponding offset dub-directory equal to the offset sub-directory of the first input time, accessing the collected data stored in the offset sub-directory; and in the non-centralized storage directory, acquiring a collection time sub-directory with a collection time the same as the first input time less than a threshold offset, accessing the collected data stored in the collection time sub-directory.

Figure 4:
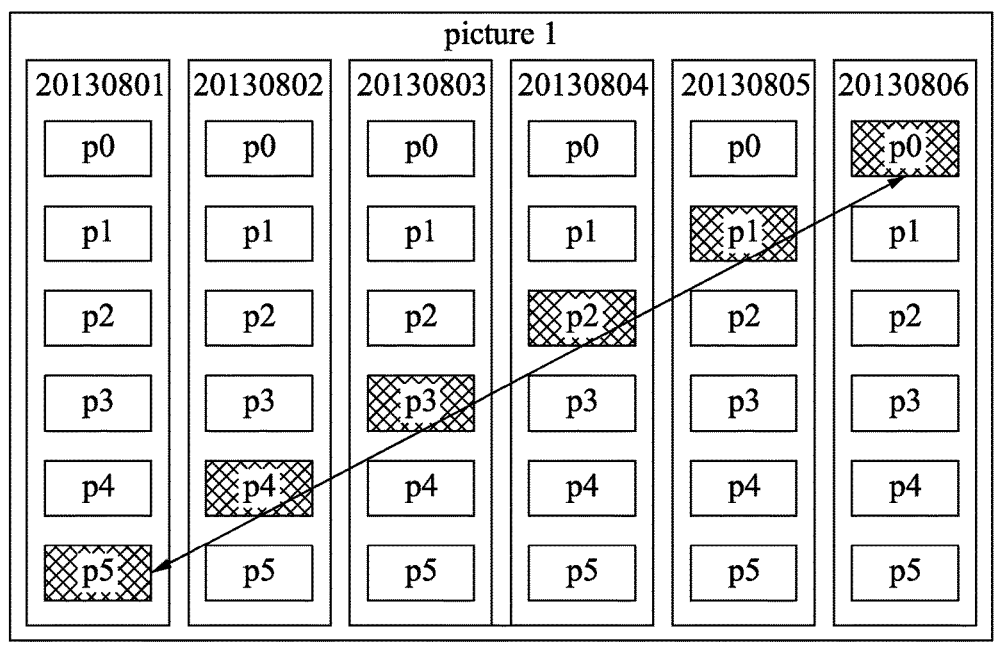
FIG. 4 is a schematic view showing a process of locating an offset sub-directory under a centralized storage directory when accessing data according to an embodiment of the present invention.

For example, as shown in FIG. 4, if the user inputs a collection time keyword corresponding to a first input time as Aug. 6, 2013, the following offset sub-directories storing corresponding collected data can be located: p5 directory under the 20130801 directory, p4 directory under the 20130802 directory, p3 directory under the 20130803 directory, p2 directory under the 20130804 directory, p1 directory under the 20130805, and p0 directory under the 20130806 directory (wherein the sum of the generation time of the corresponding generation time sub-directory and the offset of the corresponding offset sub-directory is 6), shown as the slanted line in FIG. 4. Through accessing the above offset sub-directories, the collected data with offset less than the offset threshold can be obtained.

For the collected data with offset greater than or equal to the offset threshold, the access can be directed to the non-centralized storage directory. Through directly accessing the 20130806 directory under the non-centralized storage directory, the collected data with offset greater than or equal to the offset threshold can be obtained.

As the above shows, by accessing respectively the sub-directories under the centralized storage directory and non-centralized storage directory, all the collected data with collection time Aug. 6, 2013 can be obtained. Because the access process does not traverse all the collected data, location of directory storing the collected data can be obtained by simple arithmetic computation, and directly accessed. Compared to known technique, the access efficiency is improved.

For the generation time keyword, the method for accessing corresponding collected data comprises:

acquiring an inputted generation time keyword, and extracting a second input time;

in the centralized storage directory, acquiring a generation time sub-directory with a generation time the same as the second input time, accessing the collected data stored in the generation time sub-directory and its offset sub-directory; and in the non-centralized storage directory, traversing all the collection time sub-directories and accessing the collected data stored in the collection time sub-directory with generation time the same as the second input time.

For example, if the user inputs a generation time keyword corresponding to a second input time as Aug. 1, 2013, the 20130801 directory under the centralized storage directory can be directly accessed, and in the non-centralized storage directory, all the collection time sub-directories are traversed to access the collected data with generation time as Aug. 1, 2013.

Because the offset threshold can be set to be a larger number, the amount of the collected data stored in the collection time sub-directories under the non-centralized storage directory is smaller. Compared to the traversal to all the collected data in the known technique, the traversal of the collected data under the non-centralized directory in the present invention is more efficient.

In another embodiment, the statistics server can also adapt the offset threshold according to the collected data uploaded by the sampling servers, specifically, comprising:

traversing the collected data stored in the centralized storage directory and sub-directories, an non-centralized storage directory and sub-directories, accessing the generation time and collection time of the collected data, and computing the corresponding offset;

according to the following equation:

$$P(T) = \frac{S(T)}{N} \times 100\%$$

to generate offset probability distribution, wherein S(T) is the sum of the number of the collected data with offset less than 1, N is the total number of the collected data, P(T) is the offset probability distribution; accessing the default probability threshold, and updating the offset threshold according to the probability threshold.

For example, if there are 100 collected data, and the number of the collected data corresponding to different offsets is listed in the following table:

| | Shift (T) | | | | | | | |
|---|---|---|---|---|---|---|---|---|
| | 0 | 1 | 2 | 3 | 4 | 5 | 6 | >7 |
| number | 23 | 32 | 16 | 13 | 8 | 5 | 2 | 1 |
| S(T) | 23 | 55 | 71 | 84 | 92 | 97 | 99 | 100 |
| P(T) | 23% | 55% | 71% | 84% | 92% | 97% | 99% | 100% |

If the default probability threshold is 98%, it means that the default threshold must be greater than the offset of 98% of the collected data. Therefore, the offset threshold can be set as 7. If the offset probability threshold is 60%, it means that the offset threshold must be greater than the offset of 60% of the collected data. Therefore, the offset threshold can be set as 3.

It should be noted that the larger the probability threshold is set (the higher offset threshold), the less the amount of collected data stored in the non-centralized storage directory will be, and the traversal files will be less when accessing based on the generation time keyword, as well as higher access efficiency. However, when accessing based on collection time keyword, the number of offset sub-directories under the centralized storage directory will be higher and the efficiency will be lower (although still higher than known technique). The smaller the probability threshold is set (the lower offset threshold), the more the amount of collected data stored in the non-centralized storage directory will be, and the traversal files will be more when accessing based on the generation time keyword, as well as lower access efficiency. However, when accessing based on collection time keyword, the number of offset sub-directories under the centralized storage directory will be lower and the efficiency will be higher. Preferably, the default probability threshold can be set as 99.5%.

Figure 5:
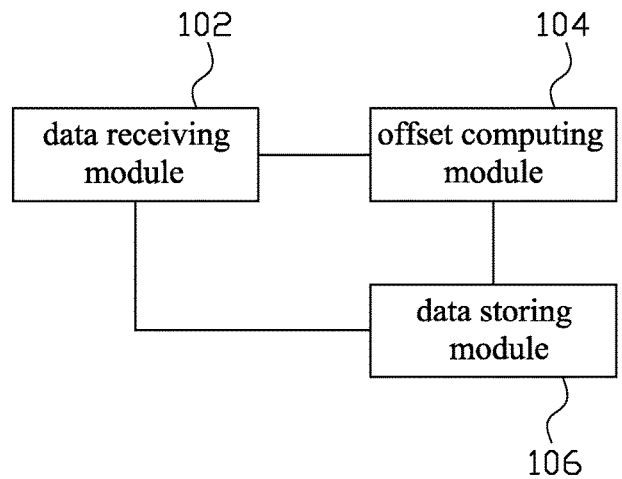
FIG. 5 is a schematic view showing a structure of a storing apparatus for data acquisition according to an embodiment of the present invention.

In an embodiment, as shown in FIG. 5, a storing apparatus for data acquisition is provided, comprising:

a data receiving module 102, for acquiring a collected data, and acquiring a generation time and a collection time for the collected data;

an offset computing module 104, for obtaining an offset by computing a difference between the generation time and the collection time; and a data storing module 106, for acquiring a default offset threshold, and determining whether the offset being less than the default offset threshold; if so, acquiring a centralized storage directory corresponding to the collected data, acquiring a generation time sub-directory corresponding to the generation time under the centralized storage directory, acquiring an offset sub-directory corresponding to the offset under the generation time sub-directory and storing the collected data in the offset sub-directory.

In the instant embodiment, the data storing module 106 is also for acquiring a non-centralized storage directory corresponding to the collected data, acquiring a collection time sub-directory corresponding to the collection time under the non-centralized storage directory, storing the collected data in the collection time sub-directory.

In another embodiment, the data storing module 106 is further for acquiring a data type of the collected data; acquiring a type directory corresponding to the data type; and acquiring the centralized storage directory/non-centralized storage directory under the type directory.

Figure 6:
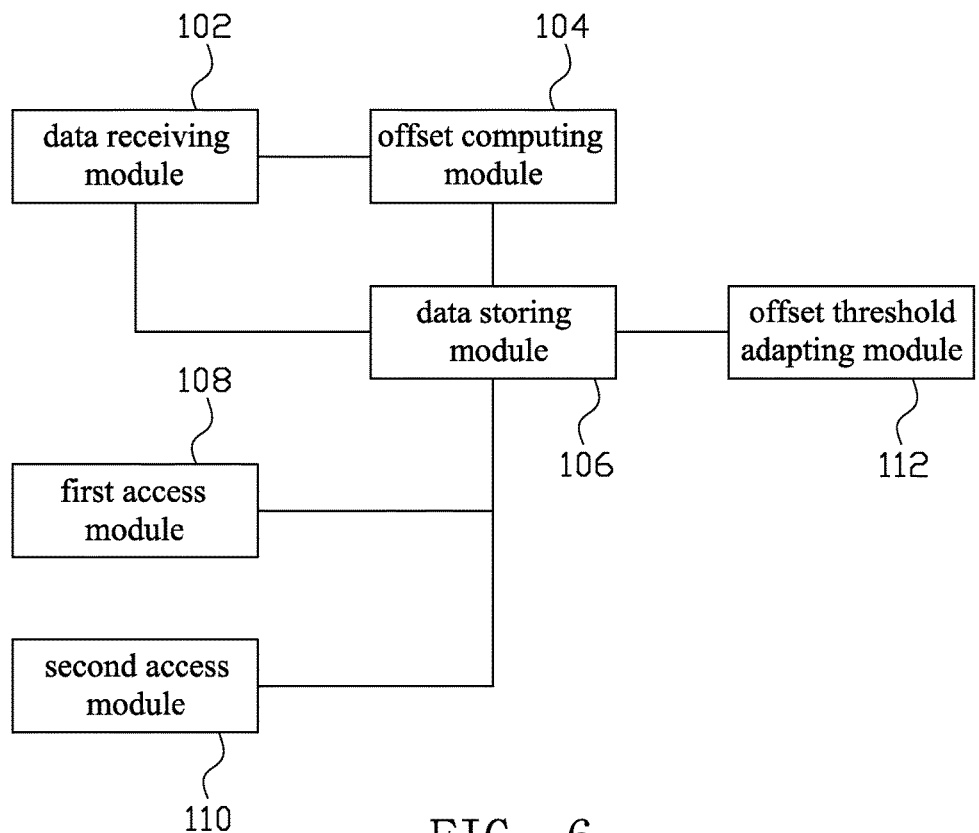
FIG. 6 is a schematic view showing a structure of a storing apparatus for data acquisition according to another embodiment of the present invention.

In an embodiment, as shown in FIG. 6, the storing apparatus for data acquisition also comprises a first access module 108, for acquiring an inputted collection time keyword, and extracting a first input time; in the centralized storage directory, acquiring a generation time sub-directory with a generation time differing from the first input time by less than a threshold offset, and the sum of the generation time of the corresponding generation time sub-directory and the offset of the corresponding offset dub-directory equal to the offset sub-directory of the first input time, accessing the collected data stored in the offset sub-directory; and in the non-centralized storage directory, acquiring a collection time sub-directory with a collection time the same as the first input time less than a threshold offset, accessing the collected data stored in the collection time sub-directory.

In an embodiment, as shown in FIG. 6, the storing apparatus for data acquisition also comprises a second access module 110, for acquiring an inputted generation time keyword, and extracting a second input time; in the centralized storage directory, acquiring a generation time sub-directory with a generation time the same as the second input time, accessing the collected data stored in the generation time sub-directory and its offset sub-directory; and in the non-centralized storage directory, traversing all the collection time sub-directories and accessing the collected data stored in the collection time sub-directory with generation time the same as the second input time.

In an embodiment, as shown in FIG. 6, the storing apparatus for data acquisition also comprises an offset threshold adapting module 112, for traversing the collected data stored in the centralized storage directory and sub-directories, an non-centralized storage directory and sub-directories, accessing the generation time and collection time of the collected data, and computing the corresponding offset; according to the following equation:

$$P(T) = \frac{S(T)}{N} \times 100\%$$

to generate offset probability distribution, wherein S(T) is the sum of the number of the collected data with offset less than 1, N is the total number of the collected data, P(T) is the offset probability distribution; accessing the default probability threshold, and updating the offset threshold according to the probability threshold.

The above storing method and apparatus for data acquisition employs an offset threshold, and determines the position of the collected data in the centralized storage directory based on the offset threshold, and stores the collected data in the offset sub-directory corresponding to the offset under the generation time sub-directory corresponding to the generation time of the collected data under the centralized storage directory, and can find the position of and access the collected data in the corresponding directory according to the offset. Compared to the known technique of traversing all the collected data when accessing, the present invention improves the access efficiency.

Figure 7:
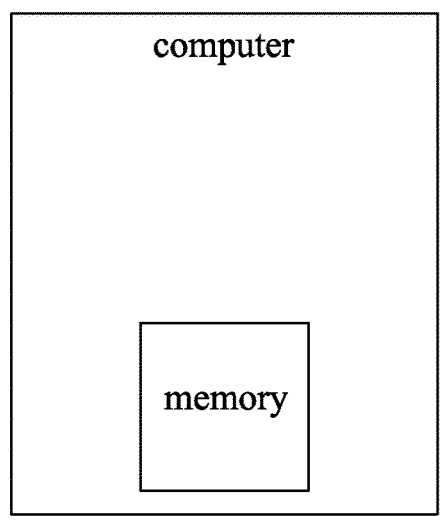
FIG. 7 is a schematic view showing a computer system in which the storing method according to the present invention implemented in software that is loaded in a memory is executed.

With the above description of the embodiments, those with ordinary skills in the art should understand that all or a part of the described processes of the present invention may be realized through software with necessary common hardware, as well as through hardware. However, the former may be a preferred realization in many applications. Based on such an understanding, as shown in FIG. 7, the technical solution of the present invention may be embodied in software products and the software product may be stored in a readable storage medium, such as, floppy disk, hard disk, CD, Read-Only memory (ROM), or random access memory (RAM), and so on, including a plurality of instructions so that a computer (such as personal computer, server or network device) can execute the method described in the embodiments of the present invention.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A storing method for data acquisition performed at a computer having one or more processors and memory storing programs to be executed by the one or more processors, the method comprising:
    acquiring a plurality of data samples, wherein each data sample is associated with a generation time indicating when the data sample is sampled and a collection time indicating when the data sample is recorded, the generation time being prior to the collection time;
    obtaining an offset for each data sample by computing a difference between the generation time and the collection time of the data sample;
    acquiring a default offset threshold, wherein, for one or more data samples having the generation time but different collection time, at least a predefined percentage of the one or more data samples whose associated offsets are within the default offset;
    determining, for each data sample, whether the offset of the data sample is less than the default offset threshold;
    in accordance with a determination that a first offset of a first data sample is less than the default offset threshold, acquiring a hierarchical centralized storage directory corresponding to the plurality of data samples, wherein the hierarchical centralized storage directory is part of a file system managed by the computer;
    identifying a first generation time sub-directory corresponding to the generation time of the first data sample from a plurality of generation time sub-directories in the file system under the hierarchical centralized storage directory, wherein each generation time sub-directory is used for storing one or more data samples having the same generation time and respectively different offsets less than the default offset threshold;

identifying a first offset sub-directory corresponding to the offset of the first data sample from a plurality of offset sub-directories under the first generation time sub-directory within the file system, wherein each offset sub-directory is used for storing one or more data samples having the same offset less than the default offset threshold;

storing the first data sample in the first offset sub-directory of the first generation time sub-directory within the hierarchical centralized storage directory of the file system such that the first data sample is sorted in the hierarchical centralized storage directory by both its generation time and its collection time;

receiving a user query including a search keyword for retrieving data samples from the file system based on the search keyword;

in accordance with a determination that the search keyword includes a generation time for retrieving data samples having the same generation time:
identifying, within the hierarchical centralized storage directory, a generation time sub-directory corresponding to the generation time in the search keyword; and
retrieving the data samples from the plurality of offset sub-directories under the identified generation time sub-directory; and in accordance with a determination that the search keyword includes a collection time for retrieving data samples having the same collection time:
identifying, within the hierarchical centralized storage directory, a plurality of offset sub-directories each having a collection time corresponding to the collection time in the search keyword, wherein the plurality of offset sub-directories are respectively under different generation time sub-directories; and
retrieving the data samples from the identified plurality of offset sub-directories under respective generation time sub-directories.

2. The storing method for data acquisition as claimed in claim 1, after the step of determining whether the offset is less than the default offset threshold, the method comprising:
in accordance with a determination that a second offset of a second data sample is greater than or equal to the offset threshold, acquiring a non-centralized storage directory corresponding to the plurality of data samples, wherein the non-centralized storage directory is part of the file system managed by the computer;
identifying a first collection time sub-directory corresponding to the collection time of the second data sample under the non-centralized storage directory; and
storing the second data sample in the first collection time sub-directory within the non-centralized storage directory of the file system.

3. The storing method for data acquisition as claimed in claim 2, wherein the hierarchical centralized storage directory and the non-centralized storage directory corresponding to the plurality of data samples are acquired through the following steps:
identifying a data type of a respective data sample of the plurality of data samples;
identifying a type directory from a plurality of type directories of the file system corresponding to the data type of the respective of data sample; and
acquiring, in accordance with the determination result of whether the offset of the respective data sample is less than the default offset threshold, the hierarchical centralized storage directory or the non-centralized storage directory under the identified type directory for the respective data sample.

4. The storing method for data acquisition as claimed in claim 2, wherein when the search keyword includes a collection time for retrieving data samples having the same collection time, the method further comprising:
extracting a first input time in accordance with the collection time in the search keyword;
in the hierarchical centralized storage directory,
identifying one or more generation time sub-directories having respective generation times each of which differs from the first input time by less than the default offset threshold;
identifying an offset sub-directory under each of the identified one or more generation time sub-directories, wherein the combination of a generation time of a respective generation time sub-directory of the identified one or more generation time sub-directories and the offset of the offset sub-directory under the respective generation time sub-directory is equal to the first input time; and
accessing the data samples stored in the identified offset sub-directories; and
in the non-centralized storage directory,
identifying a collection time sub-directory with a collection time being the same as the first input time; and
accessing the data samples stored in the identified collection time sub-directory.

5. The storing method for data acquisition as claimed in claim 2, wherein when the search keyword includes a generation time for retrieving data samples having the same generation time, the method further comprising:
extracting a second input time in accordance with the generation time in the search keyword;
in the non-centralized storage directory,
traversing all the collection time sub-directories and accessing the data samples stored in the collection time sub-directories each with a generation time being the same as the second input time.

6. The storing method for data acquisition as claimed in claim 1, wherein acquiring the default offset threshold comprises:
according to the equation:

$$P(T) = \frac{S(T)}{N} \times 100\%,$$

generating an offset probability distribution table for the plurality of data samples, the offset probability distribution table listing:
a plurality of predetermined offsets,
for each predetermined offset, a total number $S(T)$ of the data samples with respective offsets less than or equal to the corresponding predetermined offset, wherein N is the total number of the plurality of data samples, and
an offset probability $P(T)$ of each predetermined offset;

determining a probability threshold for the plurality of data samples; and updating the default offset threshold to be the offset corresponding to the probability threshold in the offset probability distribution table.

7. A computer for data acquisition having one or more processors and memory storing programs to be executed by the one or more processors, the memory storing instructions for:

acquiring a plurality of data samples, wherein each data samples is associated with a generation time indicating when the data sample is sampled and a collection time indicating when the data sample is recorded, the generation time being prior to the collection time;

obtaining an offset for each data sample by computing a difference between the generation time and the collection time of the corresponding data sample;

acquiring a default offset threshold, wherein, for one or more data samples having the generation time but different collection time, at least a predefined percentage of the one or more data samples whose associated offsets are within the default offset;

determining, for each data sample, whether the offset of the data sample is less than the default offset threshold;

in accordance with a determination that a first offset of a first data sample is less than the default offset threshold, acquiring a hierarchical centralized storage directory corresponding to the plurality of data samples, wherein the hierarchical centralized storage directory is part of a file system managed by the computer;

identifying a first generation time sub-directory corresponding to the generation time of the first data sample from a plurality of generation time sub-directories in the file system under the hierarchical centralized storage directory, wherein each generation time sub-directory is used for storing one or more data samples having the same generation time and respectively different offsets less than the default offset threshold;

identifying a first offset sub-directory corresponding to the offset of the first data sample from a plurality of offset sub-directories under the first generation time sub-directory within the file system, wherein each offset sub-directory is used for storing one or more data samples having the same offset less than the default offset threshold;

storing the first data sample in the first offset sub-directory of the first generation time sub-directory within the hierarchical centralized storage directory of the file system such that the first data sample is sorted in the hierarchical centralized storage directory by both its generation time and its collection time;

receiving a user query including a search keyword for retrieving data samples from the file system based on the search keyword;

in accordance with a determination that the search keyword includes a generation time for retrieving data samples having the same generation time:
identifying, within the hierarchical centralized storage directory, a generation time sub-directory corresponding to the generation time in the search keyword; and
retrieving the data samples from the plurality of offset sub-directories under the identified generation time sub-directory; and in accordance with a determination that the search keyword includes a collection time for retrieving data samples having the same collection time:
identifying, within the hierarchical centralized storage directory, a plurality of offset sub-directories each having a collection time corresponding to the collection time in the search keyword, wherein the plurality of offset sub-directories are respectively under different generation time sub-directories; and
retrieving the data samples from the identified plurality of offset sub-directories under respective generation time sub-directories.

8. The computer for data acquisition as claimed in claim 7, wherein the memory further stores instructions for:

in accordance with a determination that a second offset of a second data sample is greater than or equal to the offset threshold, acquiring a non-centralized storage directory corresponding to the plurality of data samples, wherein the non-centralized storage directory is part of the file system managed by the computer;

identifying a first collection time sub-directory corresponding to the collection time of the second data sample under the non-centralized storage directory; and storing the second data sample in the first collection time sub-directory within the non-centralized storage directory of the file system.

9. The computer for data acquisition as claimed in claim 8, wherein the hierarchical centralized storage directory and the non-centralized storage directory corresponding to the plurality of data samples are acquired by:

identifying a data type for a respective data sample of the plurality of data samples;

identifying a type directory from a plurality of type directories of the file system corresponding to the data type of the respective of data sample; and in accordance with the determination result of whether the offset of the respective data sample is less than the default offset threshold, acquiring the hierarchical centralized storage directory or the non-centralized storage directory under the identified type directory for the respective data sample.

10. The computer for data acquisition as claimed in claim 8, wherein when the search keyword includes a collection time for retrieving data samples having the same collection time, the memory further stores instructions for:

extracting a first input time in accordance with the collection time in the search keyword;

in the hierarchical centralized storage directory,
identifying one or more generation time sub-directories having respective generation times each of which differs from the first input time by less than the default offset threshold;
identifying an offset sub-directory under each of the identified one or more generation time sub-directories, wherein the combination of a generation time of a respective generation time sub-directory of the identified one or more generation time sub-directories and the offset of the offset sub-directory under the respective generation time sub-directory is equal to the first input time; and
accessing the data samples stored in the identified offset sub-directories; and in the non-centralized storage directory,
identifying a collection time sub-directory with a collection time being the same as the first input time; and
accessing the data samples stored in the identified collection time sub-directory.

11. The computer for data acquisition as claimed in claim 8, wherein when the search keyword includes a generation time for retrieving data samples having the same generation time, the memory further stores instructions for:
   extracting a second input time in accordance with the generation time in the search keyword;
   in the non-centralized storage directory,
      traversing all the collection time sub-directories and accessing the data samples stored in the collection time sub-directories each with a generation time being the same as the second input time.

12. The computer for data acquisition as claimed in claim 7, wherein acquiring the default offset threshold comprises:
   according to the equation:

$$P(T) = \frac{S(T)}{N} \times 100\%,$$

generating an offset probability distribution table for the plurality of data samples, the offset probability distribution table listing:
   a plurality of predetermined offset numbers,
   for each predetermined offset number, a total number $S(T)$ of the data sample with respective offsets less than or equal to the corresponding predetermined offset, wherein N is the total number of the plurality of data samples, and
   an offset probability $P(T)$ of each predetermined offset; and
determining a probability threshold for the plurality of data samples; and
updating the default offset threshold to be the offset corresponding to the probability threshold in the offset probability distribution table.

13. A non-transitory computer-readable storage medium comprising a set of instructions for data acquisition, the set of instructions to direct at least one processor to perform operations including:
   acquiring a plurality of data samples, wherein each data sample is associated with a generation time indicating when the data sample is sampled and a collection time indicating when the data sample is recorded, the generation time being prior to the collection time;
   obtaining an offset for each data sample by computing a difference between the generation time and the collection time of the corresponding data sample;
   acquiring a default offset threshold, wherein, for one or more data samples having the generation time but different collection time, at least a predefined percentage of the one or more data samples whose associated offsets are within the default offset;
   determining, for each data sample, whether the offset of the corresponding data sample is less than the default offset threshold;
   in accordance with a determination that a first offset of a first data sample is less than the default offset threshold, acquiring a hierarchical centralized storage directory corresponding to the plurality of data samples, wherein the hierarchical centralized storage directory is part of a file system managed by the computer;
   identifying a first generation time sub-directory corresponding to the generation time of the first data sample from a plurality of generation time sub-directories in the file system under the hierarchical centralized storage directory, wherein each generation time sub-directory is used for storing one or more data samples having the same generation time and respectively different offsets less than the default offset threshold;
   identifying a first offset sub-directory corresponding to the offset of the first data sample from a plurality of offset sub-directories under the first generation time sub-directory within the file system, wherein each offset sub-directory is used for storing one or more data samples having the same offset less than the default offset threshold;
   storing the first data sample in the first offset sub-directory of the first generation time sub-directory within the hierarchical centralized storage directory of the file system such that the first data sample is sorted in the hierarchical centralized storage directory by both its generation time and its collection time;
   receiving a user query including a search keyword for retrieving data samples from the file system based on the search keyword;
   in accordance with a determination that the search keyword includes a generation time for retrieving data samples having the same generation time:
      identifying, within the hierarchical centralized storage directory, a generation time sub-directory corresponding to the generation time in the search keyword; and
      retrieving the data samples from the plurality of offset sub-directories under the identified generation time sub-directory; and
   in accordance with a determination that the search keyword includes a collection time for retrieving data samples having the same collection time:
      identifying, within the hierarchical centralized storage directory, a plurality of offset sub-directories each having a collection time corresponding to the collection time in the search keyword, wherein the plurality of offset sub-directories are respectively under different generation time sub-directories; and
   retrieving the data samples from the identified plurality of offset sub-directories under respective generation time sub-directories.

14. The non-transitory computer-readable storage medium of claim 13, wherein the operations further comprise:
   after determining whether the offset is less than the default offset threshold,
      in accordance with a determination that a second offset of a second data sample is greater than or equal to the offset threshold, acquiring a non-centralized storage directory corresponding to the plurality of data samples, wherein the non-centralized storage directory is part of the file system managed by the computer;
      identifying a first collection time sub-directory corresponding to the collection time of the second data sample under the non-centralized storage directory; and
      storing the second data sample in the first collection time sub-directory within the non-centralized storage directory of the file system.

15. The non-transitory computer-readable storage medium of claim 14, wherein the hierarchical centralized storage directory and the non-centralized storage directory corresponding to the plurality of data samples are acquired by:
   identifying a data type of a respective data sample of the plurality of data samples;

identifying a type directory from a plurality of type directories of the file system corresponding to the data type of the respective of data sample; and acquiring, in accordance with the determination result of whether the offset of the respective data sample is less than the default offset threshold, the hierarchical centralized storage directory or the non-centralized storage directory under the identified type directory for the respective data sample.

16. The non-transitory computer-readable storage medium of claim 14, wherein when the search keyword includes a collection time for retrieving data samples having the same collection time, the operations further comprise:

extracting a first input time in accordance with the collection time in the search keyword;

in the hierarchical centralized storage directory,
identifying one or more generation time sub-directories having respective generation times each of which differs from the first input time by less than the default offset threshold;

identifying an offset sub-directory under each of the identified one or more generation time sub-directories, wherein the combination of a generation time of a respective generation time sub-directory of the identified one or more generation time sub-directories and the offset of the offset sub-directory under the respective generation time sub-directory is equal to the first input time; and accessing the data samples stored in the identified offset sub-directories; and in the non-centralized storage directory,
identifying a collection time sub-directory with a collection time being the same as the first input time; and accessing the data samples stored in the identified collection time sub-directory.

17. The non-transitory computer-readable storage medium of claim 14, wherein when the search keyword includes a generation time for retrieving data samples having the same generation time, the operations further comprise:

extracting a second input time in accordance with the generation time in the search keyword;

in the non-centralized storage directory,
traversing all the collection time sub-directories and accessing the data samples stored in the collection time sub-directories each with a generation time being the same as the second input time.

18. The non-transitory computer-readable storage medium of claim 14, wherein acquiring the default offset threshold comprises:

according to the equation:

$$P(T) = \frac{S(T)}{N} \times 100\%,$$

generating an offset probability distribution table for the plurality of data samples, the offset probability distribution table listing:

a plurality of predetermined offsets, for each predetermined offset, a total number S(T) of the data samples with respective offsets less than or equal to the corresponding predetermined offset, wherein N is the total number of the plurality of data samples, and an offset probability P(T) of each predetermined offset; and determining a probability threshold for the plurality of data samples; and updating the default offset threshold to be the offset corresponding to the probability threshold in the offset probability distribution table.

* * * * *